United States Patent
Jankowski et al.

(10) Patent No.: US 9,248,706 B2
(45) Date of Patent: Feb. 2, 2016

(54) APPARATUS FOR COUPLING A TPMS WHEEL UNIT AND A VALVE STEM INTO AN ASSEMBLY, THE ASSEMBLY AND INSTALLATION THEREOF

(71) Applicant: Continental Automotive Systems, Inc., Auburn Hills, MI (US)

(72) Inventors: Martin Jankowski, Macomb, MI (US); Jean-Christophe Deniau, Fenton, MI (US); Matthew D McIntyre, New Baltimore, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 206 days.

(21) Appl. No.: 14/143,849

(22) Filed: Dec. 30, 2013

(65) Prior Publication Data
US 2015/0183278 A1 Jul. 2, 2015

(51) Int. Cl.
*B60C 23/00* (2006.01)
*B60C 25/18* (2006.01)
*B60C 23/04* (2006.01)

(52) U.S. Cl.
CPC ............... *B60C 23/00* (2013.01); *B60C 23/04* (2013.01); *B60C 25/18* (2013.01)

(58) Field of Classification Search
None
See application file for complete search history.

(56) References Cited

U.S. PATENT DOCUMENTS

| | | | | |
|---|---|---|---|---|
| 7,536,904 B1* | 5/2009 | Yu | ....................... | B60C 23/0408 73/146 |
| 7,784,337 B2 | 8/2010 | Kim | | |
| 2004/0251444 A1* | 12/2004 | Levey | .................... | B67D 3/045 251/231 |
| 2005/0087228 A1* | 4/2005 | Uleski | ................. | B60C 23/0408 137/223 |
| 2006/0272402 A1* | 12/2006 | Yin | ..................... | B60C 23/0494 73/146.8 |
| 2006/0272758 A1* | 12/2006 | Yin | ..................... | B60C 23/0408 152/427 |
| 2007/0295076 A1* | 12/2007 | Blossfeld | ............ | B60C 23/0494 73/146.8 |
| 2010/0064791 A1* | 3/2010 | Chuang | ............... | B60C 23/0494 73/146.8 |
| 2010/0064792 A1* | 3/2010 | Chuang | ............... | B60C 23/0494 73/146.8 |
| 2012/0304755 A1* | 12/2012 | Chuang | ............... | B60C 23/0494 73/146.8 |
| 2015/0183281 A1* | 7/2015 | Deniau | ................. | B60C 29/005 73/146.8 |

FOREIGN PATENT DOCUMENTS

| | | | |
|---|---|---|---|
| EP | 1818193 A1 | 8/2007 | |
| GB | 2255850 A * | 11/1992 | .......... B60C 23/0496 |
| WO | 2008/151267 A1 | 12/2008 | |
| WO | 2013/131799 A1 | 9/2013 | |
| WO | 2014/019645 A1 | 2/2014 | |

OTHER PUBLICATIONS

Search Report dated Aug. 7, 2014, from corresponding GB Patent Application No. GB1401542.4.

* cited by examiner

*Primary Examiner* — Andre Allen

(57) ABSTRACT

An apparatus for coupling a TPMS wheel unit and a valve stem into an assembly, the assembly and the installation method therefore are disclosed. The apparatus comprises an elastic member configured to counteract in response to mechanical communication between a bulb and a wall, wherein the wall is comprised in the TPMS wheel unit and the bulb is comprised in the valve stem; and a fastening mechanism configured to couple the TPMS wheel unit, the valve stem and the elastic unit.

20 Claims, 3 Drawing Sheets

APPARATUS FOR COUPLING A TPMS WHEEL UNIT AND A VALVE STEM INTO AN ASSEMBLY, THE ASSEMBLY AND INSTALLATION THEREOF

BRIEF DESCRIPTION OF THE DRAWINGS

For a more complete understanding of the disclosure, reference should be made to the following detailed description and accompanying drawings wherein.

Figure 1:
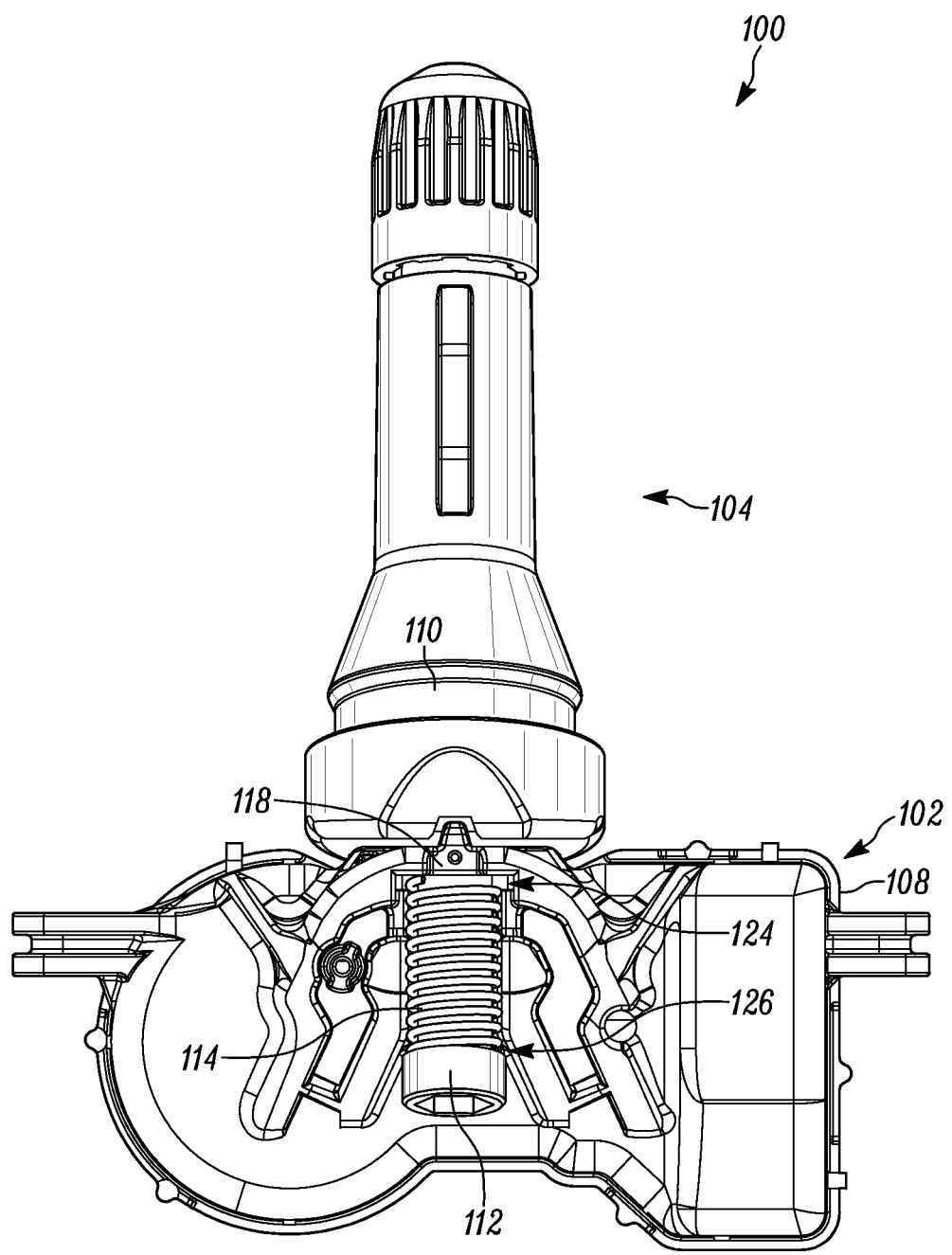
FIG. 1 comprises a schematic pictorial view of an exemplary TPMS wheel unit and valve stem assembly.

Skilled artisans will appreciate that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the present invention. Also, common but well-understood elements that are useful or necessary in a commercially feasible embodiment are often not depicted in order to facilitate a less obstructed view of these various aspects of the present invention. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

A number of approaches to monitor the tire pressure and other characteristics of wheels and tires on vehicles are in use today. One of the more popular approaches uses wheel rim mounted Tire Pressure Monitoring System ("TPMS") wheel units. A TPMS wheel unit comprises a sensing and a communication device placed in the inflation cavity of the wheel, the inflation cavity being typically defined by the wheel rim and a tubeless tire. The TPMS wheel unit senses the conditions inside the tire, for example pressure and temperature, and transmits data indicative of the conditions to a TPMS receiver. Upon being received, the data is interpreted to display tire condition related information, for example under-inflation warnings, as needed or desired.

Many of the rim mounted TPMS wheel units are coupled to the rim with valve stems. Some valve stems comprise a rubber bulb partially fixedly covering a rigid, typically metallic, tubular member and are mounted to the rim by pushing or pulling the valve stem partially through the valve hole of the wheel rim so that the bulb straddles the two sides of the rim wall through the valve hole. To facilitate adequate sealing against the rim and retention to the rim the valve hole of the rim is smaller in diameter than some sections of the bulb. Accordingly, when the valve stem is pushed or pulled through the valve hole, the diameter of a section of the valve stem bulb will decrease to conform to and at least partially pass through the valve hole. As the diameter of the valve stem bulb decreases, the length of the valve stem bulb increases, for example due to the Poisson effect. Accordingly, a TPMS wheel unit that is fixedly attached to the valve stem's rigid tube on the side of the bulb's elongation should not be touching the valve stem bulb immediately prior to installation as the TPMS wheel unit risks preventing the bulb from suitably penetrating the rim or causing the TPMS wheel unit to itself be damaged in the installation process.

Some current rubber bulb valve stems for TPMS wheel units are designed to provide a gap between the valve stem bulb and the TPMS wheel unit's housing. This gap allows for stretching of the valve stem bulb during the urging of the valve stem through the valve stem hole with the TPMS wheel unit already attached while reducing the risk of installation related damage to the TPMS wheel unit itself.

However, such approach places the TPMS wheel unit farther away from the rim wall. As the TPMS wheel unit is placed farther from the wheel rim, the center of mass of the TPMS wheel unit and the valve stem assembly often also moves farther away from the wheel rim. As the center of mass of the TPMS wheel unit and valve stem assembly is moved farther away from the wheel rim the maximum safe vehicle operating speed is reduced. This is because, for example, the torques and forces acting on the valve stem are increased or become more unevenly balanced. As the forces and torques at a given speed are increased or become more unevenly balanced the risk and extent of valve stem deformation or dislocation in and about the valve hole increases and thus the risk of tire deflation increases. Because the forces and torques increase at higher speeds and any imbalances are magnified, the maximum safe vehicle operating speed is reduced to remain within acceptable deformation and dislocation limits.

Another approach is to attach or re-attach the TPMS wheel unit to the valve stem after the valve stem has been installed in the valve hole in the rim. This approach allows for no significant gap between the TPMS wheel unit and the valve stem bulb. However, the valve stem and TPMS wheel unit is not installed through the valve hole as one final assembly, which complicates the design and installation.

For example, one design contains a clip that holds the housing linked in place to a roll pin, the roll pin being an extension of the valve stem's inflation tube. The roll pin has notches or teeth to engage with the clip. During sensor mounting on the rim, the clip is pushed inward and the roll pin is pushed toward the rim, thus extending the bulb. When the bulb sufficiently penetrates the rim hole, the roll pin is released and so is the clip. Due to its spring effect, the clip engages up into the roll pin notches, thus locking the housing and the roll pin together. However, because the clip is depressed before or during the installation, the installation is viewed by some as somewhat complicated.

Therefore, an alternative approach to allow the valve stem bulb to be extended during mounting of the valve stem while the valve stem is already assembled with the TPMS wheel unit, the TPMS wheel unit to stay as close as practicable to the rim for better dynamic performance, and the TPMS wheel unit to be firmly connected to the valve stem is desired.

With reference to FIG. 1, in an aspect the approach comprises coupling the TPMS wheel unit 102 to the valve stem 104 using an elastic mechanism allowing the valve stem to travel with respect to the TPMS wheel unit housing 108 to amortize the elongation of the valve stem bulb 110 pushing on the TPMS wheel unit housing 108. In an example the elastic mechanism comprises a fastening mechanism 112 and an elastic member 114, for example a screw and spring respectively. However, the disclosure contemplates the use of other suitable fastening mechanisms 112, such as, for example, rivets, nuts, flanges, bulges, adhesives, spring clips, pins, threads, and otherwise, as well as combinations thereof. Similarly, the disclosure contemplates the use of suitable elastic members 114 other than springs, such as, for example, elastic rings, tubes, washers, bladders and otherwise, as well as various types of springs, such as, for example, helical, conical, leaf, volute, torsion, disc, bellevile, or otherwise. The fastening mechanism 112 maintains the valve stem 104 and the TPMS wheel unit 102 in an assembled relationship with each other while the elastic member 114 biases the TPMS wheel unit housing 108 against the valve stem bulb 110.

With reference to FIGS. 2-5 and continued reference to FIG. 1, in an aspect the valve stem 104 comprises a tubular member 202, 302, 402, 502 configured to mechanically communicate with a wall 118, 206, 306, 406, 506, of the TPMS wheel unit housing 108, for example abut, couple to, connect to, pass through, be partially embedded in the wall 118, or otherwise. In an example the wall 118, 206, 306, 406, 506 is configured to receive the tubular member 202, 302, 402, 502 and reduce the degree of play in directions other than substantially along the major axis of the tubular member 202, 302, 402, 502 when the assembly 100 comprising TPMS wheel unit 102 and valve stem 104 is installed in the wheel rim.

Figure 2:
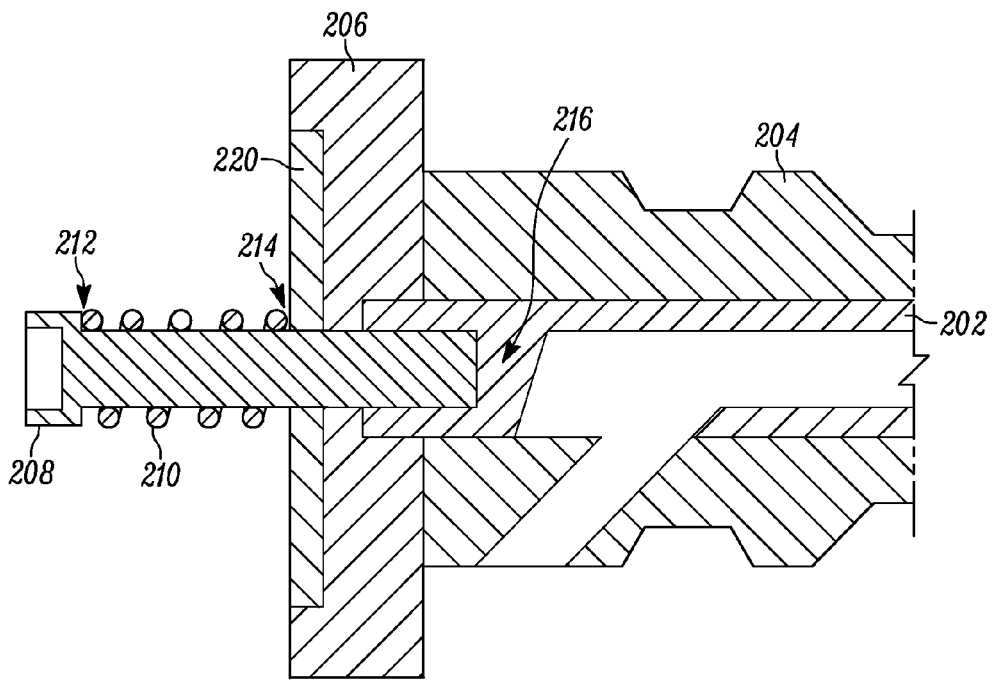
FIG. 2 comprises a sectional schematic pictorial view of an exemplary valve stem affixing apparatus in an uncompressed state.
Figure 3:
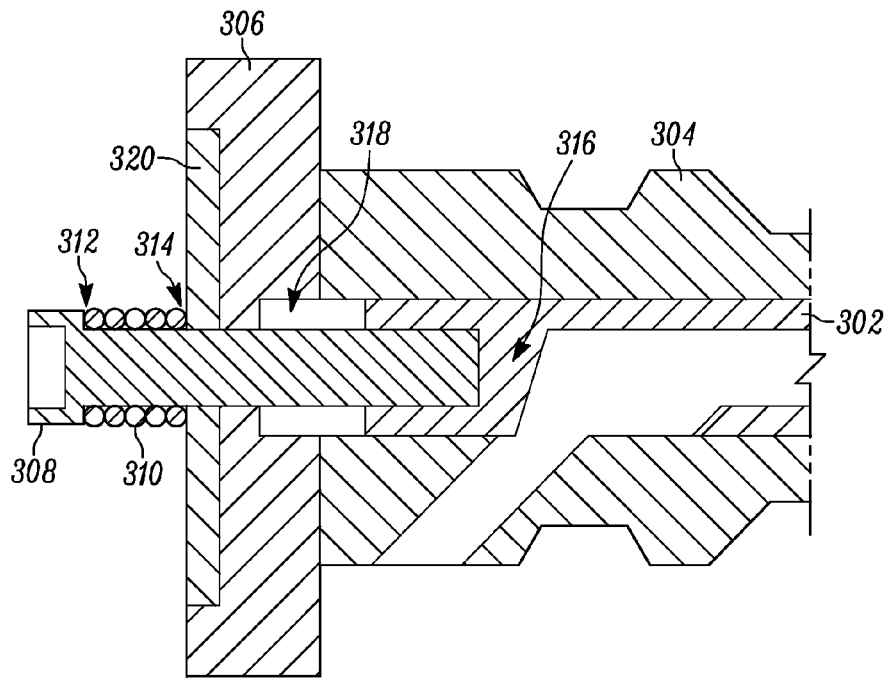
FIG. 3 comprises a sectional schematic pictorial view of an exemplary valve stem affixing apparatus in a compressed state.
Figure 4:
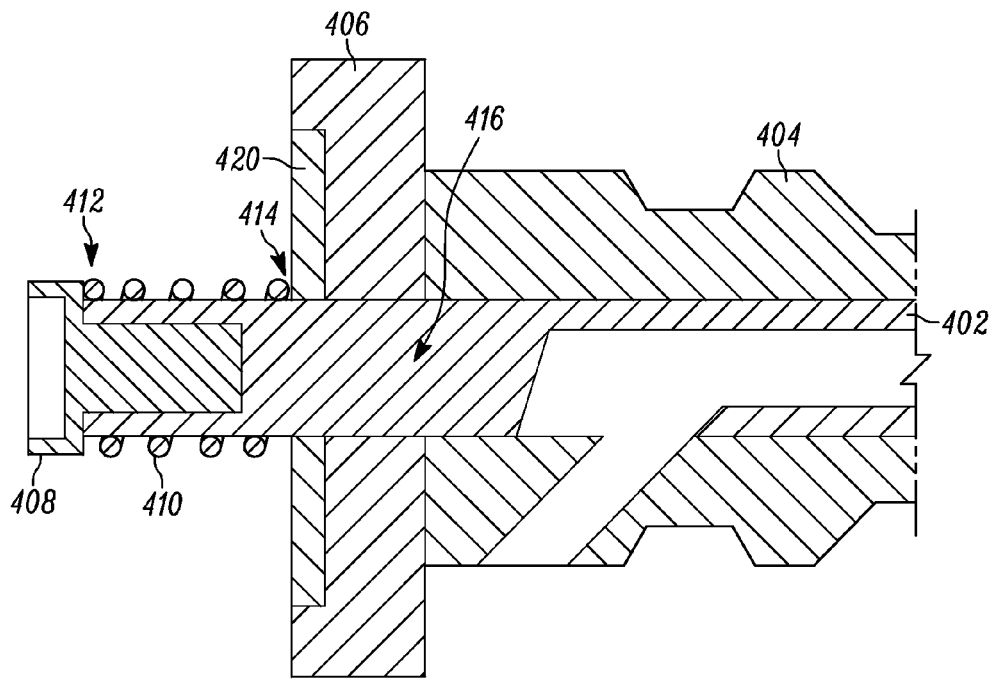
FIG. 4 comprises a sectional schematic pictorial view of an alternative exemplary valve stem affixing apparatus in an uncompressed state.
Figure 5:
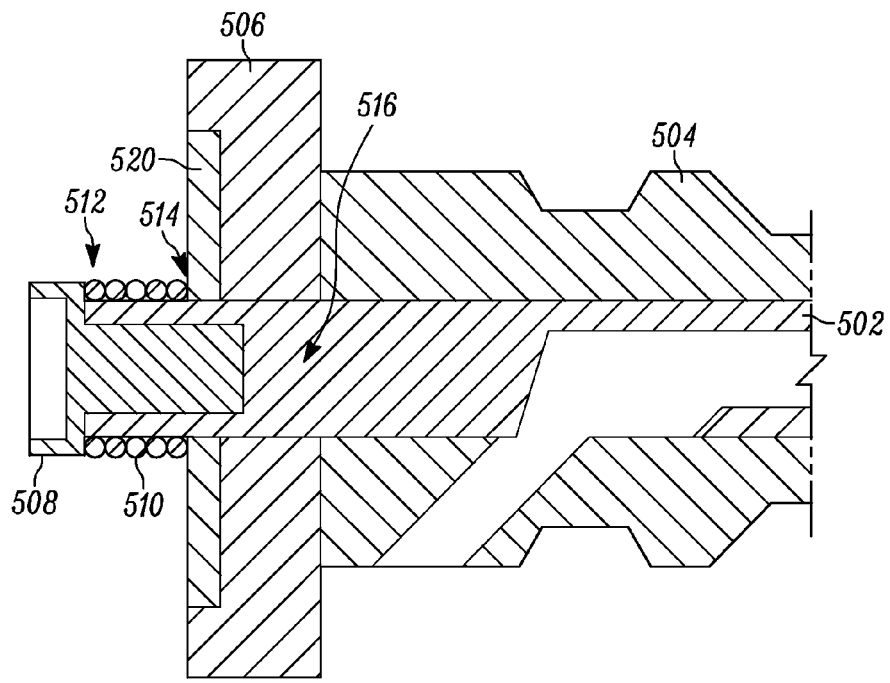
FIG. 5 comprises a sectional schematic pictorial view of an alternative exemplary valve stem affixing apparatus in a compressed state.

With reference to FIGS. 2 and 3, in an example the wall defines a bore 318 at least partially penetrating the wall 206, 306 of TPMS wheel unit housing. The bore 318 is configured to receive the tubular member 202, 302. With reference to FIGS. 4 and 5, in an example the tubular member 402, 502 is configured to penetrate the wall 406, 506 of the TPMS wheel unit housing.

In an aspect the tubular member 202, 302, 402, 502 comprises, for example, an open cylinder, a roll pin, other hollow core, or combination thereof suitable for being comprised in a valve stem 104.

With reference to FIGS. 1-3, in an aspect the elastic member 114, 210, 310 is configured to at least partially surround a section of the fastener 112, 208, 308. With reference to FIGS. 1 and 4-5, in an aspect the elastic member 114, 410, 510 is configured to at least partially surround a section of the tubular member 402, 502. In both aspects the elastic member is configured to mechanically communicate with the wall 118, 206, 306, 406, 506 in the proximity of one end 124, 214, 314, 414, 514 of the elastic member 114, 210, 310, 410, 510 and the fastening mechanism 112, 208, 308, 408, 508 in proximity to the other end 126, 212, 312, 412, 512 for example to suitably abut, couple to, connect to, pass through, be partially embedded in, or otherwise. In an example the elastic member 210, 310, 410, 510 communicates mechanically with the wall via a bracket 220, 320, 420, 520, the bracket spreading the forces exerted by the elastic member 210, 310, 410, 510 on the wall.

In an aspect the fastening mechanism 112 is configured to resist the forces exerted by the elastic member 114 and the bulb 110 thereon and maintain the assembled relationship between the TPMS wheel unit and the valve stem. With reference to FIGS. 2-5, in an example the fastening mechanism 208, 308, 408, 508 is configured to mechanically couple to the tubular member 202, 302, 402, 502, for example by being screwed in or onto, pressed in or onto, adhering to, forming a part of, being comprised in the tubular member 202, 302, 402, 502, or otherwise. In an example the fastening mechanism 112, 202, 302, 402, 502 is configured to facilitate disassembly of the TPMS wheel unit 102 from the valve stem 104, for example by unscrewing, pulling out or off, unclipping from the tubular member 202, 302, 402, 502, or otherwise. In an example the fastening mechanism 208, 308, 408, 508 is configured to at least partially penetrate the wall 118, 206, 306, 406, 506 between the side distal from the bulb 204, 304, 404, 504 and the side proximal to the bulb 204, 304, 404, 504. In another example the fastening mechanism 112 is configured not to penetrate the wall 118.

In an aspect, the tubular member 202, 302, 402, 502 and the fastening mechanism 208, 308, 408, 508 are configured or are configurable to regulate the forces exerted by the elastic member 210, 310, 410, 510, for example by limiting the pre-compression of the elastic member 210, 310, 410, 510 or by regulating the force curve of the elastic member 210, 310, 410, 510. In an example the tubular member comprises a stop 216, 316, 416, 516, limiting the engagement of the fastening mechanism 208, 308, 408, 508. In an example, the fastening mechanism's 208, 308, 408, 508 dimensions can be selected to increase or decrease the pre-compression, for example if the fastening mechanism 208, 308, 408, 508 is a screw or a bolt, different length screws or bolts can be selected to produce desirable pre-compression level. Similarly, the length of the thread on the screw or bolt may be used to limit the engagement in addition to or in lieu of the stop. Also, the elastic member's 210, 310, 410, 510 characteristics and dimensions can be varied to produce suitable absorption and retention force characteristics.

In an aspect the assembly 100 is installed into the rim using the following method. A wheel rim defining a valve hole is provided. The assembly 100 comprising the valve stem 104, the TPMS wheel unit 102, the fastening mechanism 112 and the elastic member 114, the valve stem being coupled to the TPMS wheel unit by the fastening mechanism and the elastic member, is provided. The valve stem is urged into the valve hole in the rim so that the bulb 110 lengthens thus communicating a force through the TPMS wheel unit's 102 wall 118 to the elastic member 114. The communicated force is counteracted by the elastic member being compressed between the wall 118 and the fastening mechanism. The valve 104 stem is urged until the bulb 110 penetrates the rim sufficiently for the bulb 110 to adequately seal against the rim and permanently retain the bulb 110 in the rim. The urging is discontinued. In an example the force communicated to the elastic member through the wall is communicated through a bracket to spread the communicated force on the wall. In an example the force of the elastic member counteracting the communicated force is communicated to the wall through a bracket to spread the counteracting force on the wall. The bulb adequately seals against the rim when the bulb prevents deflation of the tire through the valve hole around the bulb suitably to the vehicle's purpose. The bulb is permanently retained in the rim when the bulb remains inserted into the valve hole suitably to the vehicle's purpose.

Those skilled in the art will recognize that a wide variety of modifications, alterations, and combinations can be made with respect to the described embodiments without departing from the spirit and scope of the invention, and that such modifications, alterations, and combinations are to be viewed as being within the scope of the invention. Further, those skilled in the art will recognize that the approaches described herein may also be used to design components and devices other than those listed above.

The invention claimed is:

1. A TPMS assembly comprising:
    a TPMS wheel unit, the TPMS wheel unit comprising a wall;
    a valve stem, the valve stem comprising a bulb;
    an elastic member, the elastic member configured to counteract in response to mechanical communication between the bulb and the wall; and
    a fastening mechanism, the fastening mechanism coupling the valve stem, the TPMS wheel unit and the elastic member.

2. The TPMS assembly as described in claim 1 wherein elastic member is configured to at least partially receive the mechanical communication through the wall.

3. The TPMS assembly as described in claim 1 wherein the counteraction comprises compressing the elastic member.

4. The TPMS assembly as described in claim 3 wherein the compressing comprises compressing between the wall and the fastening mechanism.

5. The TPMS assembly as described in claim 1 wherein the elastic member at least partially surrounds a section of the valve.

6. The TPMS assembly as described in claim 1 wherein the elastic member at least partially surrounds a section of the fastening mechanism.

7. The TPMS assembly as described in claim 1 wherein the fastening mechanism is configured to at least partially penetrate the wall.

8. The TPMS assembly as described in claim 1 wherein the valve stem at least partially penetrates the wall.

9. The TPMS assembly as described in claim 1 wherein the fastening mechanism comprises one of a screw and a bolt.

10. The TPMS assembly as described in claim 1 wherein the elastic member comprises a spring.

11. The TPMS assembly as described in claim 1 wherein the valve stem is configured to limit engagement of the fastening mechanism with the valve stem.

12. The TPMS assembly as described in claim 1 wherein the valve stem comprises a stop configured to limit engagement of the fastening mechanism with the valve stem.

13. The TPMS assembly as described in claim 1 wherein the fastening mechanism is configured to limit engagement of the fastening mechanism with the valve stem.

14. An apparatus for coupling a TPMS wheel unit to a valve stem, the apparatus comprising:
    an elastic member configured to counteract in response to mechanical communication between a bulb and a wall, wherein the wall is comprised in the TPMS wheel unit and the bulb is comprised in the valve stem; and
    a fastening mechanism configured to couple the TPMS wheel unit, the valve stem and the elastic unit.

15. A method of installing a TPMS wheel unit and valve stem assembly comprising:
    providing a wheel rim defining a valve hole;
    providing a valve stem, a TPMS wheel unit, and an elastic member coupled by a fastening mechanism, wherein the valve stem comprises a bulb and the TPMS wheel unit comprises a wall;
    urging the valve stem into the valve hole such that the bulb lengthens;
    communicating a force exerted by the lengthening through the wall to the elastic member;
    counteracting the communicated force with the elastic member.

16. The method as described in claim 15 further comprising continuing to urge the valve stem until the bulb penetrates the rim.

17. The method as described in claim 16 wherein the penetrating is sufficient for the bulb to adequately seal against the rim.

18. The method as described in claim 16 wherein the penetrating is sufficient for the bulb to be permanently retained in the rim.

19. The method as described in claim 15 wherein the counteracting comprises compressing the elastic member between the wall and the fastening mechanism.

20. The method as described in claim 15 wherein the communicating and counteracting comprises spreading the respective communication and counteraction on the wall by a bracket.

* * * * *